US010776082B2

(12) United States Patent
Dey et al.

(10) Patent No.: US 10,776,082 B2
(45) Date of Patent: Sep. 15, 2020

(54) PROGRAMMING ENVIRONMENT AUGMENT WITH AUTOMATED DIALOG SYSTEM ASSISTANCE

(71) Applicant: International Business Machines Corporation, Armonk, NY (US)

(72) Inventors: Kuntal Dey, New Delhi (IN); Seema Nagar, Bangalore (IN); Meenal Kapoor, Gurgaon (IN); Vinayak Sastri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/202,759

(22) Filed: Nov. 28, 2018

(65) Prior Publication Data

US 2020/0167134 A1 May 28, 2020

(51) Int. Cl.
*G06F 9/44* (2018.01)
*G06F 8/34* (2018.01)
(Continued)

(52) U.S. Cl.
CPC ............... *G06F 8/34* (2013.01); *G06F 8/65* (2013.01); *G06F 40/242* (2020.01); *G06F 40/30* (2020.01); *G06F 3/0482* (2013.01); *G06F 9/451* (2018.02)

(58) Field of Classification Search
CPC . G06F 3/0482; G06F 8/34; G06F 8/65; G06F 9/451; G06F 17/2735; G06F 17/2785; G06F 40/242; G06F 40/30
(Continued)

(56) References Cited

U.S. PATENT DOCUMENTS

| 6,233,726 B1 * | 5/2001 | Bowman | G06F 8/20 |
| | | | 707/999.102 |
| 6,629,087 B1 * | 9/2003 | Benson | G06F 17/24 |
| | | | 704/2 |

(Continued)

OTHER PUBLICATIONS

Wightman et al., "SnipMatch: Using Source Code Context to Enhance Snippet Retrieval and Parameterization", 2012, ACM, 10 pages (Year: 2012).*

(Continued)

*Primary Examiner* — Ted T. Vo
(74) *Attorney, Agent, or Firm* — Ryan, Mason & Lewis, LLP (57) ABSTRACT

Methods, systems and computer program products for augmenting a programming environment for developing software code using an automated dialog system are provided herein. A computer-implemented method includes monitoring actions taken in the programming environment, determining intent of the actions taken, and generating a natural language dialog in a graphical user interface of the automated dialog system. The natural language dialog comprises suggested additional actions to be taken based at least in part on the determined intent, where the suggested additional actions affect code files in the programming environment. The computer-implemented method also includes providing, in the graphical user interface, user-activatable interface features for selecting respective ones of the suggested additional actions, and modifying one or more of the code files in the programming environment in accordance with a given suggested additional action, responsive to detecting selection of a given user-activatable interface feature corresponding to the given suggested additional action.

15 Claims, 7 Drawing Sheets

(51) Int. Cl.
  *G06F 8/65* (2018.01)
  *G06F 40/30* (2020.01)
  *G06F 40/242* (2020.01)
  *G06F 3/0482* (2013.01)
  *G06F 9/451* (2018.01)
(58) Field of Classification Search
  USPC .................................................. 717/104–115
  See application file for complete search history.

(56) References Cited

U.S. PATENT DOCUMENTS

| | | | |
|---|---|---|---|
| 8,266,585 B2 | 9/2012 | Funto et al. | |
| 8,307,333 B2 | 11/2012 | Peterson | |
| 9,369,410 B2 | 6/2016 | Capper et al. | |
| 9,411,803 B2 | 8/2016 | Assulin et al. | |
| 9,619,211 B2 | 4/2017 | McCollum et al. | |
| 10,025,565 B2 * | 7/2018 | Garipov | G06F 8/34 |
| 2012/0260263 A1 | 10/2012 | Edoja | |
| 2015/0268939 A1 * | 9/2015 | Kelapure | G06F 8/40 717/112 |
| 2016/0026439 A1 | 1/2016 | Zaydman et al. | |
| 2016/0357519 A1 * | 12/2016 | Vargas | G06F 9/451 |
| 2017/0052766 A1 * | 2/2017 | Garipov | G06F 8/34 |
| 2019/0166070 A1 * | 5/2019 | Dey | G06K 9/00228 |

OTHER PUBLICATIONS

Campbell et al., "NLP2Code: Code Snippet Content Assist via Natural Language Tasks", 2017, IEEE, pp. 628-632 (Year: 2017).*

* cited by examiner

PROGRAMMING ENVIRONMENT AUGMENT WITH AUTOMATED DIALOG SYSTEM ASSISTANCE

FIELD

The present invention relates to information technology, and more particularly, to programming.

BACKGROUND

Automated dialog systems, also referred to herein as conversation systems, are used in a wide variety of application areas. For example, automated dialog systems may be used to create various workspaces having different dialog flows for implementing chatbots for customer support, user interaction, etc. A chatbot is a computer program or other software which is capable of carrying out conversational communications via auditory and/or textual processes. Chatbots may be implemented as finite state machines. Such a system generally includes entities and dialog nodes, wherein each dialog node is a state in the finite state machine. Based on the user utterance received and the current dialog node, the system decides whether to move to a next and/or new dialog node.

SUMMARY

Embodiments of the invention provide techniques for programming or software code development aided by assistance from an automated dialog system or chatbot.

In one embodiment, an exemplary computer-implemented method comprises steps of monitoring one or more actions taken in a programming environment for developing software code, determining intent of the one or more actions taken in the programming environment, generating a natural language dialog in a graphical user interface of an automated dialog system associated with the programming environment, the natural language dialog comprising one or more suggested additional actions to be taken in the programming environment based at least in part on the determined intent, wherein the one or more suggested additional actions comprise one or more actions that affect code of one or more code files in the programming environment, providing, in the graphical user interface, one or more user-activatable interface features for selecting respective ones of the one or more suggested additional actions, and modifying one or more of the code files in the programming environment in accordance with a given one of the one or more suggested additional actions, responsive to detecting selection of a given one of the user-activatable interface features corresponding to the given suggested additional action. The steps are carried out by at least one computing device.

In another embodiment, an exemplary computer-implemented method comprises steps of monitoring, via an automated dialog system associated with a programming environment for developing software code, one or more actions taken in the programming environment, generating, in a graphical user interface of the automated dialog system, a natural language dialog conversation associated with the one or more actions taken in the programming environment, presenting, in the graphical user interface, a given user-activatable interface feature associated with a given portion of the natural language dialog conversation, the given portion of the natural language dialog conversation comprising a suggested additional action for modifying at least one aspect of the programming environment, and implementing the suggested additional action for modifying the at least one aspect of the programming environment, responsive to selection via the graphical user interface of the given user-activatable interface feature. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems, and devices for programming aided or augmented using an automated dialog system. However, it is to be understood that embodiments of the invention are not limited to the illustrative methods, systems and devices but instead are more broadly applicable to other suitable methods, systems and devices.

In a programming or software code development system, there is a need for providing assistance to a programmer, developer or other user in producing a program or software code. Programming help or assistance may take the form of providing suggestions to the user in the form of autocompletes (e.g., using program structures, constructs, scopes, etc.), syntax correction and other features. To provide assistance at the semantic level, the system needs to understand programming intricacies. To provide assistance at the syntax level, the system needs to understand program constructs.

In some systems, programming assistance or augmentation may take the form of "drag-and-drop" libraries to simplify the program or software code development process. With such functionality, the user often does not need to understand programming, and may create a program workflow by composing components internally using such drag-and-drop libraries. The program workflow may include a data pipeline that flows across the composed components in a manner that respects data type adherence.

Even with such tools and features, however, custom programming will remain as there is no software development suite that provides a full solution to every programming problem. Thus, programmers or developers are still needed, even if drag-and-drop libraries exist, as the drag-and-drop libraries serve a limited scope and are not able to resolve at finer and deeper levels beyond their inherent limitations and thus fail to reach the level of what is feasible by human programmers or developers. Further, as availability of complex assets (e.g., more libraries, more open-source code repositories, etc.) continues to increase along with an ever-widening set of versatile requirements, there exists a need for simplifying a programming or software development system.

Illustrative embodiments meet these and other needs through augmenting a programming interface or other software development environment (e.g., an integrated development environment (IDE)) with an automated dialog system or chatbot. The chatbot enables a programmer with a reasonable skill level to interact with the chatbot using natural language, and eases the cognitive load on the programmer to create programming solutions. In some embodiments, such functionality includes the chatbot providing information to the programmer in the dialog (e.g., such as textual suggestions, links to relevant information sources, etc.). In other embodiments, such functionality further or alternatively includes the chatbot taking code-level actions (e.g., through suggestion of code which, when accepted by the programmer, is automatically entered into a program or software at a relevant point), etc.

The chatbot in some embodiments is able to suggest code constructs by using one or more of: (i) an inherent help process of an IDE; (ii) external formal documents; (iii) external known libraries; (iv) external code sources (e.g., GitHub®); (v) web and social media sources which discuss programming tools and constructs; and (vi) other external sources. In some embodiments, as noted above, the chatbot is enabled for taking code-level actions, such as letting the programmer augment code, classpaths, and runtime exception handlers by activating a user interface feature of the chatbot (e.g., by "clicking" or selecting a button, link or other interface feature to adopt a chatbot's suggestion).

In some embodiments, a chatbot or other automated dialog system is utilized to provide assistance to software program code developers or programmers, wherein the chatbot is configured to proactively and/or reactively generate suggestions and responses to queries facilitating development of the software program code. The suggestions and responses may be "actionable" directly from within the interface of the chatbot or other automated dialog system, meaning that the programmer or other user is able to click or otherwise select suggestions made by the chatbot to initiate an action (e.g., a code import event, adding a classpath, adding a library or version of a library, monitoring and updating the code for runtime exceptions, etc.) that is taken in the code IDE. Such actions may be implemented through a hook or other application programming interface (API) that the IDE exposes to the integrated chatbot for publishing in the event of user selection of one or more of the suggestions.

In some embodiments, the chatbot or automated dialog system may automatically take one or more such actions without requiring user input or other selection (e.g., such as on determining with a threshold level of confidence that a particular suggestion or suggestions will be adopted). The chatbot or automated dialog system in some embodiments may automatically take such actions to affect the code in the IDE in a manner that allows the user to accept or reject changes to the code directly in the IDE (e.g., in a code editing pane) rather than the user accepting or rejecting a suggestion that is provided in a dialog pane of the chatbot.

Figure 1:
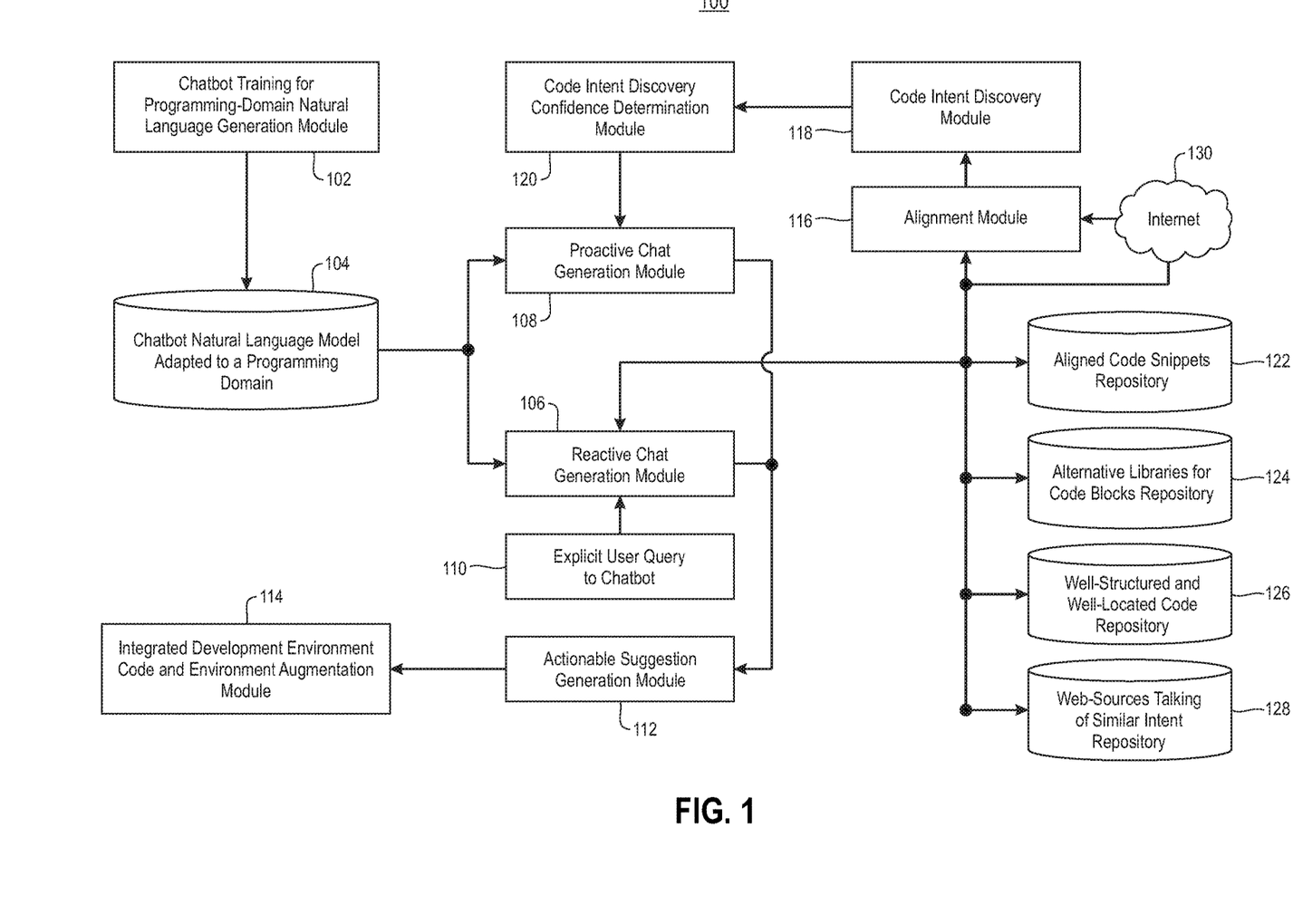
FIG. 1 depicts a programming environment including an automated dialog system for programming assistance, according to an exemplary embodiment of the present invention.

FIG. 1 shows a system 100 including a programming environment with an integrated chatbot or automated dialog system for programming assistance. The system 100 provides a chatbot or automated dialog system that is aware of the programming domain, programming language, an IDE, and programming as a whole. In some embodiments, this is provided by training the chatbot or automated dialog system utilizing the chatbot training natural language generation module 102, where the chatbot is trained specifically for the programming domain. The module 102 provides as output a chatbot natural language model 104 that is adapted to the programming domain.

The system 100 further includes a reactive chat generation module 106 and a proactive chat generation module 108, which utilize the chatbot natural language model 104 for providing natural language dialog in the chatbot or automated dialog system interface.

The reactive chat generation module 106 is configured to understand natural language queries 110 that are made by programmers or other users, and to provide appropriate output such as actionable suggestions as described above, queries to the programmer, etc. The proactive chat generation module 108, as will be described in further detail below, may also generate output such as actionable suggestions or queries to the programmer, though not in response to explicit user queries 110 to the chatbot interface.

In the reactive mode of operation, one or more explicit user queries 110 are provided to the chatbot interface, and the reactive chat generation module 106 utilizes the chatbot natural language model 104 to analyze or resolve the queries to provide an appropriate response. The reactive chat generation module 106 uses the chatbot natural language model 104 to understand various types of queries, such as to determine whether a given one of the user queries 110 is about the programming IDE (e.g., queries form a relatively inexperienced programmer that is learning the IDE, etc.), whether the given query is about the programming language (e.g., queries related to syntax, etc.), whether the given query relates to achieving a goal within a programming function, whether the given query relates to the availability of ready-made solutions (e.g., one or more libraries) to meet one or more specified requirements, whether the given query relates to so-called philosophical understandings of programming (e.g., determining how one or more programming communities view and resolve problems similar to those being faced by the user submitting the given query), etc. On classifying the given query, the reactive chat generation module 106 provides responses by searching at appropriate levels or from appropriate information sources or repositories.

In the proactive mode of operation, the proactive chat generation module 108 may automatically generate queries to the user or actionable suggestions based on a determined intent of the programmer using the programming environment. To do so, the proactive chat generation module 108 may monitor the progress of a programmer to automatically identify the programmer's intent at different levels (e.g., at a code line level, function level, program level, etc.) and create queries for the user that are presented in the chatbot interface. Based on responses to such queries, the proactive chat generation module 108 searches at appropriate levels or from appropriate information sources or repositories.

The reactive chat generation module 106 and proactive chat generation module 108, as noted above, are configured to respond to explicit user queries 110 or to generate queries based on the programmer's intent and present such queries and/or responses to the programmer in a conversational mode by generating natural language text on the chatbot's interface (e.g., a dialog pane thereof) using the chatbot natural language model 104, which as noted above is adapted to the programming domain via training utilizing module 102.

In the reactive mode of operation, the responses are generated by the reactive chat generation module 106 in a conversational mode which uses the chatbot natural language model 104 that wraps around the core of the responses. The core of the response may be provided from various sources, such as aligned code snippets from aligned code snippets repository 122, library documentation snippets from alternative libraries repository 124, IDE documentation and tooltips or programming practice manual and textbook snippets from the well-structured and well-located code repository 126, web quotes from a web-sources talking of similar intent repository 128, or the Internet 130, etc. Information from one or more of the repositories 122, 124, 126, 128, or from Internet 130, provides the core of the response presented in the chatbot interface, where the core is wrapped using conversational language generated utilizing the chatbot natural language model 104.

For the proactive mode of operation, the proactive chat generation module 108 also provides responses in a conversational mode. The proactive chat generation module 108, however, may be further configured to greet the programmer or other user when the chatbot interface is first activated, and to generate queries and responses that are tailored to what the programmer or other user is doing by monitoring the programmer's actions in the IDE. For example, on startup or activation, the proactive chat generation module 108 may be configured to provide a response/query as follows: "Hello, I am the live assistant for <Name of IDE>. Here's a suggestion—it appears you are attempting to do <action> between code lines 24-36 that you just completed. On the web <here>, I have seen similar lines of code, and your function name matches the intent of their discussion topic. Someone has provided an alternative that is indicated as more efficient, and many users have liked it. Do you want to take a look at it?" If the user or programmer then provides input of "Yes" or another affirmative response, the proactive chat generation module 108 provides an appropriate response, which may include presentation of one or more actionable suggestions as described in further detail below.

As noted above, the reactive chat generation module 106 and proactive chat generation module 108 may also or alternatively provide actionable suggestions to the user via actionable suggestion generation module 112. The actionable suggestion generation module 112 is configured to present actionable suggestions to the user, either via a dialog pane of the chatbot interface or directly in a code editing pane of the IDE, along with options for the user to accept or reject the suggestions. Responsive to the user accepting one or more suggestions, IDE code and environment augmentation module 114 implements the accepted suggestions. The actionable suggestion generation module 112 and the augmentation module 114 collectively provide a "tunnel" that connects the chatbot interface to the IDE for taking an appropriate action (e.g., code insertion, exception monitoring, etc.) responsive to user selection of one or more of the suggestions. The tunnel may be implemented via one or more APIs exposed by the IDE that permit the chatbot or automated dialog system to take such actions.

Before turning to an example of code and environment augmentation using the system 100, a more detailed discussion of code intent discovery and alignment will be provided. As discussed above, in the proactive mode of operation, the proactive chat generation module 108 monitors the programmer's actions in the IDE in order to provide responses and queries to the programmer that are useful based on the context of the programmer's actions. This may involve finding the "intent" of the programmer based on the programmer's actions. Although described primarily in the context of the proactive mode of operation, it should be appreciated that determining the programmer's intent may also be useful in the reactive mode of operation, and thus the reactive chat generation module 106 may similarly determine the programmer's intent to provide more relevant responses to explicit user queries 110 that are based on the context of the programmer's actions in the IDE in addition to the content of the explicit user queries 110.

To find the programmer's intent, the system 100 utilizes an alignment module 116, code intent discovery module 118, and a code intent discovery confidence determination module 120, the functionality of which are described below.

Code intent in some embodiments is found by inspecting several aspects of the code in the IDE, including but not limited to programmer's comments in the code, the program name, function names, variable names, etc. While the programmer's comments are usually in a human-readable language or form and thus relatively easy to parse using natural language processing (NLP) techniques for intent discovery, other program constructs may not be in a human-readable form. For example, program constructs such as program or project names, file names, function names, function parameter names, variable names, etc. may be analyzed by dividing such constructs into dictionary words or terms to the extent possible. In some embodiments, word boundaries in such program constructs are disambiguated by changes in case (e.g., calculateFactorial is split into "calculate" and "factorial" based on the change in case), use of underscores or other special characters (e.g., calculate_factorial is split into "calculate" and "factorial" using the underscore), etc.

Even after splitting program constructs using such word boundaries, there may be words or strings that are not found in a dictionary. In such cases, surrounding words or terms may be used to derive context, and the top-K words among the most frequently co-occurring concepts of these surrounding words may be checked for sequential alphabet containment match of the words or strings not in the dictionary to derive corresponding dictionary words. For example, consider the program construct smlLetter, which is divided first into "sml" and "letter" using the change in case for word boundary. Further assume that the program containing the smlLetter program construct also contains the program construct letterCases. Thus, the word "small" will be found as a word in the dictionary that often occurs with "letter" and "cases," and which contains s, m and l in the same sequence as the non-dictionary word or string "sml." Thus, "sml" may be interpreted as "small."

For each dictionary word that is obtained, and for each clause that is obtained (e.g., "calculate factorial"), the alignment module 116 carries out alignment using external documents, other keywords present in other documents and code snippets, etc., so that the knowledge obtained from such external documents can be used. The external documents may be obtained from various repositories 122, 124, 126 or 128, or from the Internet 130. The alignment module 116 is assumed to include Internet-driven and other document retrieval mechanisms for interacting with repositories 122, 124, 126, 128 and Internet 130.

The code intent discovery module 118 then finds the intent of the code as the intent obtained at each level of the program structure, from the coarsest (e.g., the programmer's main comments) to the finest (e.g., keywords, variables, functions, etc.).

The alignment module 116 may perform or carry out other alignment processes using similar techniques to expand function names, variable names, file names etc., at different levels. This may include: program code alignment with external code available on the web or other documentation; program code alignment with the IDE (e.g., control buttons, help documents, etc.) where the programmer is developing the code; function, block and/or overall code intent alignment between the programmer's code and online documentation; programmer's documentation alignment with external code snippets (e.g., from repository 122), libraries (e.g., from repository 124) and code sources (e.g., such as GitHub® or other web or Internet 130 sources, etc.); function and program intent alignment with external libraries (e.g., using library documentation from repository 124, using online comments about libraries from repository 128, etc.); inter-function workflow alignment; etc.

It should be noted that the output of the alignment module 116 and code intent discovery module 118, which are often found using external sources and benchmark documents, may be used for improving the quality-of-service backbone that the interactive chatbot will functionally leverage. The code intent discovery confidence determination module 120, or simply the confidence determination module 120, generates a measure of confidence in the intent discovered by the code intent discovery module 118. If the confidence is low, this indicates that the intent could not be found or there is uncertainty in the discovered intent. In such cases, the proactive chat generation module 108 may query the programmer in the dialog of the chatbot interface to confirm the discovered intent, before providing one or more actionable suggestions to the programmer. If the confidence is high, then the proactive chat generation module 108 may provide the actionable suggestions to the programmer without confirming the discovered intent (and possibly automatically implement the one or more suggestions).

A workflow for programming, augmented with an automated dialog system, will now be described with respect to the system 100 of FIG. 1. To begin, the programmer opens an IDE that is augmented with a chatbot or automated dialog system, and starts programming. As the programmer starts coding, or writing code preamble comments such as input, output, objectives, etc., the code intent discovery module 118 is triggered and executed on known elements (e.g., the file name, project name, etc.).

As internal and third-party libraries are declared for inclusion in the code, the code intent discovery module 118 is enriched. For each functional block or program construct (e.g., a for loop, etc.) and text (e.g., user comments, etc.) in the code, the code intent discovery module 118 triggers the alignment module 116 to create a potential set of aligned: (i) code snippets for local code blocks (e.g., using repository 122); (ii) alternative libraries that have potentially similar APIs (e.g., using repository 124); (iii) web-located sources (e.g., GitHub®) of well-structured codes (e.g., using repository 126); and (iv) web sources discussing similar code with the same or similar intent (as understood by the code intent discovery module 118) on forums, tutorials, etc. (e.g., using repository 128). The alignment module 116 may utilize the Internet 130 in place of, or in addition to, one or more of the repositories 122, 124, 126 and 128 to generate the potential set of aligned code snippets, alternative libraries, well-structured codes, web sources discussing similar code, etc.

For each intent discovered by the code intent discovery module 118, and for each alignment discovered by the alignment module 116, a dictionary entry is created. A chatbot or automated dialog system is trained for the programming language conversation paradigm (e.g., for a particular programming IDE) using module 102. In some embodiments, the chatbot is trained specifically to use natural language models for introducing itself and for wrapping programming constructs. The natural language model 104, however, is adapted to incorporate coding or programming jargon to converse beyond such interaction. Adapting the natural language model 104 for the programming domain may include adding program logic construct modules and programming actions (e.g., using APIs, libraries, variables, editors, IDE features, etc.) to its state-action vocabulary, and learning the sequence and context to use them. Learning the sequence and context may include learning contextual sequence generators using one or more machine learning models, such as long short-term memory units (LSTMs), gated recurrent units (GRUs) or other recurrent neural networks (RNNs), conditional random field models (CRFs), hidden Markov models (HMMs), etc., with the program state being considered as a node in the learning sequence.

In the reactive assistance mode, the reactive chat generation module 106 responds to explicit user queries 110 based upon its learned state-action vocabulary, its learning of the sequence and context, its understanding to the programmer's current state (e.g., using alignment module 116 and code intent discovery module 118 to determine what part the programmer is trying to program), and the latest sequence of actions taken (e.g., which APIs, libraries, etc. the programmer has used or attempted to use).

In the proactive assistance mode, the proactive chat generation module 108 uses the language model 104 to initiate conversation or interaction with the programmer. This may occur, for example, on startup, when the intent discovery score (e.g., from code intent discovery confidence determination module 120) crosses some threshold indicating that the code intent has changed from a last conversation or interaction between the programmer and the chatbot, etc.

In both the reactive and proactive modes of operation, the reactive chat generation module 106 and proactive chat generation module 108 utilize actionable suggestion generation module 112 to make suggestions to the programmer that are "actionable" by providing an "actionable suggestion board" or other user-activatable interface features. The programmer is enabled to select (e.g., click) a portion of one or more responses provided by the chatbot, either inside a dialog pane or which are overlayed on a code editing pane of the IDE. The actionable suggestions may include suggestions of code snippets to insert, possibly replacing one or more existing code snippets. The actionable suggestions may also or alternatively include suggestions for upgrading the environment, such as classpaths, or libraries or versions thereof. The actionable suggestions may further or alternatively include tracing code anomalies (e.g., potential runtime exceptions that require try-catch blocks, etc.). If the programmer selects one or more of the actionable suggestions, the chatbot will utilize one or more hooks or APIs exposed by the IDE to implement the selected suggestions into the code.

Figure 2:
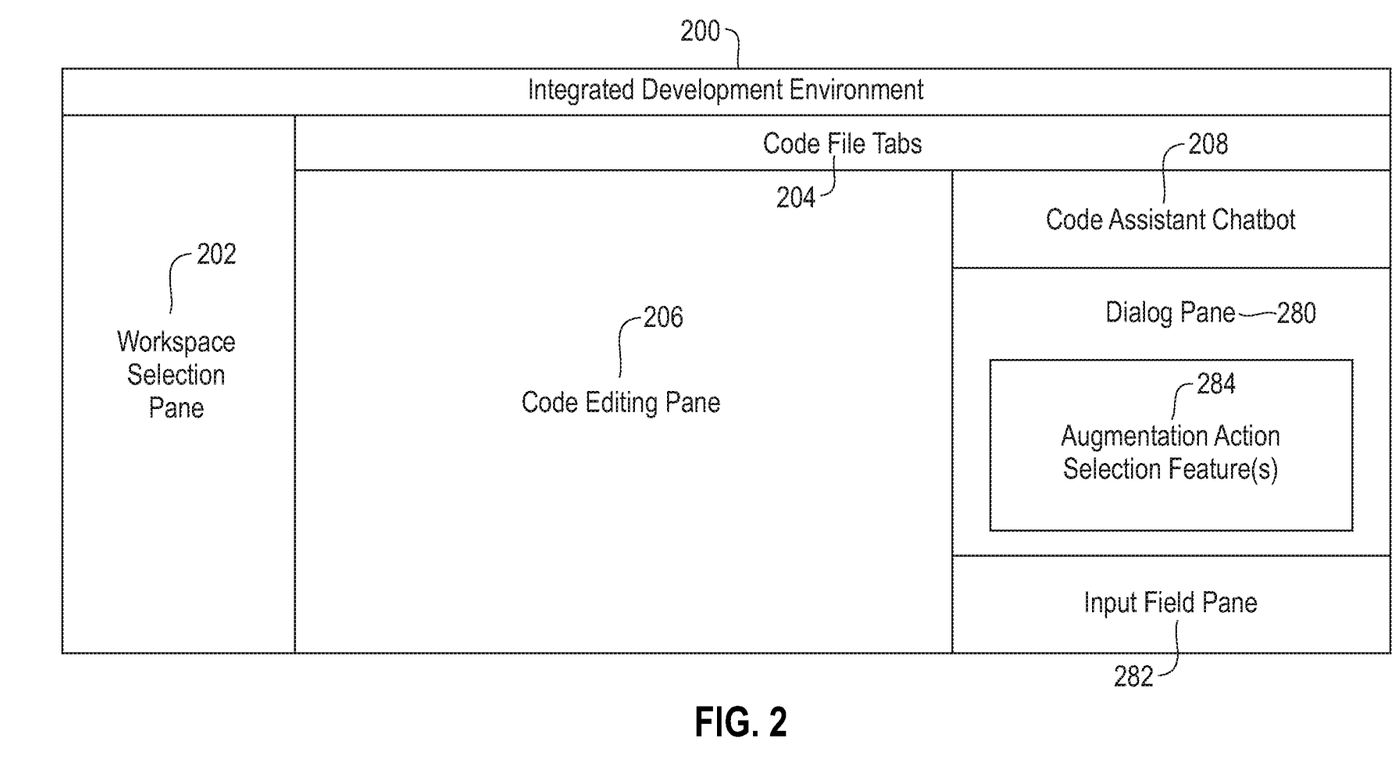
FIG. 2 depicts a view of an integrated development environment implementing the FIG. 1 system, according to an exemplary embodiment of the present invention.

FIG. 2 shows a graphical user interface (GUI) 200 of an IDE, including a workspace or project selection pane 202, a number of code file tabs 204, a code editing pane 206 and a code assistant chatbot 208. The workspace or project selection pane 202 allows the programmer to select a particular workspace, project, file, etc. to work on. The code file tabs 204 indicate code files (e.g., in the selected workspace or project, etc.) that the programmer has opened. The programmer may click or otherwise select one of the code file tabs 204 to cause the selected code file to display in the code editing pane 206. Although not shown, the GUI 200 of the IDE may include various toolbars, menus and other interface features for taking various actions (e.g., moving between the code file tabs 204, copying, cutting and pasting text, generating messages, changing the layout of the text in the code editing pane 206, zooming in and out, searching, etc.).

The code assistant chatbot 208 is an example of an interface of an automated dialog system or chatbot which augments the programming system with the functionality described herein. In the FIG. 2 example, the code assistant chatbot 208 includes a dialog pane 280, an input field pane 282, and augmentation action selection features 284. The dialog pane 280 displays dialog generated by the reactive chat generation module 106 and proactive chat generation module 108. The input field pane 282 provides an interface allowing the user to enter explicit user queries 110 or to respond to questions and requests from the automated dialog system that are presented in the dialog pane 280 of the code assistant chatbot 208.

The dialog pane 280 is also configured to present augmentation action selection features 284. In the FIG. 2 example, the augmentation action selection features 284 are presented directly in the dialog pane 280. For example, the dialog pane 280 may present an actionable suggestion, such as a code snippet for insertion into the selected code file in the code editing pane 206, which the programmer may accept or reject using the augmentation action selection features 284. As another example, the actionable suggestions may be presented directly in the code editing pane 206 (e.g., showing a highlighted code snippet in the code editing pane 206 in line with the existing code of the selected code file). The augmentation action selection features 284 may be presented in the dialog pane 280, allowing the programmer to accept or reject the possible insertion while viewing how such change will affect the code file by viewing the change in real time in the code editing pane 206. In other embodiments, the augmentation action selection features 284 may be presented in the code editing pane 206, such as via buttons or other user-activatable interface features that are overlayed over a potential actionable suggestion (e.g., a highlighted code snippet inserted into the code file of the code editing pane 206). Various other arrangements are possible.

The operation of the code assistance chatbot 208 in the GUI 200 of the IDE will now be described with respect to a particular use case. It should be appreciated, however, that this use case is presented by way of example only, and that embodiments are not limited solely to use with this use case. Assume that a programmer intends to write code for tracking a human head pose in a "HeadPoseTracker" workspace. The programmer may select a code file for a particular function, HeadPoseEstimation( ), using the code file tabs 204. The programmer may start to write the code for the HeadPoseEstimation( ) function in the code editing pane 206. While writing the code for this function, the programmer may be unsure of which facial landmarks should be saved, or may be unsure of how the facial landmarks are named in a particular environment (e.g., an OpenCV/Dlib environment).

Conventionally, the programmer would resort to searching on the web or otherwise finding documentation to read. With the code assistant chatbot 208, however, the programmer may instead submit a query to the chatbot using the input field pane 282 such as: "Which facial landmarks do I need to capture?" The code assistant chatbot 208 may mine various repositories which contain third-party code for such facial landmarks (e.g., using repositories 122, 124, 126, 128 or Internet 130). The code assistant chatbot 208 will respond to the query in the dialog pane 280 with a message such as: "Here is a close match on <resource> that also appears to perform head pose tracking and saves facial landmarks" along with a code snippet for possible insertion into the code file for the HeadPoseEstimation( ) function.

The programmer may review the actionable suggestion (e.g., the code for tracking and saving facial landmarks) and determine whether to accept or reject the suggestion using the augmentation action selection features 284 presented in the dialog pane 280. If the programmer accepts the actionable suggestion utilizing the augmentation action selection features 284, the code assistant chatbot 208 may utilize an API or other hook to transmute the code onto the IDE at the right place in the code file for the HeadPoseEstimation( ) function that is open in the code editing pane 206.

Figure 3:
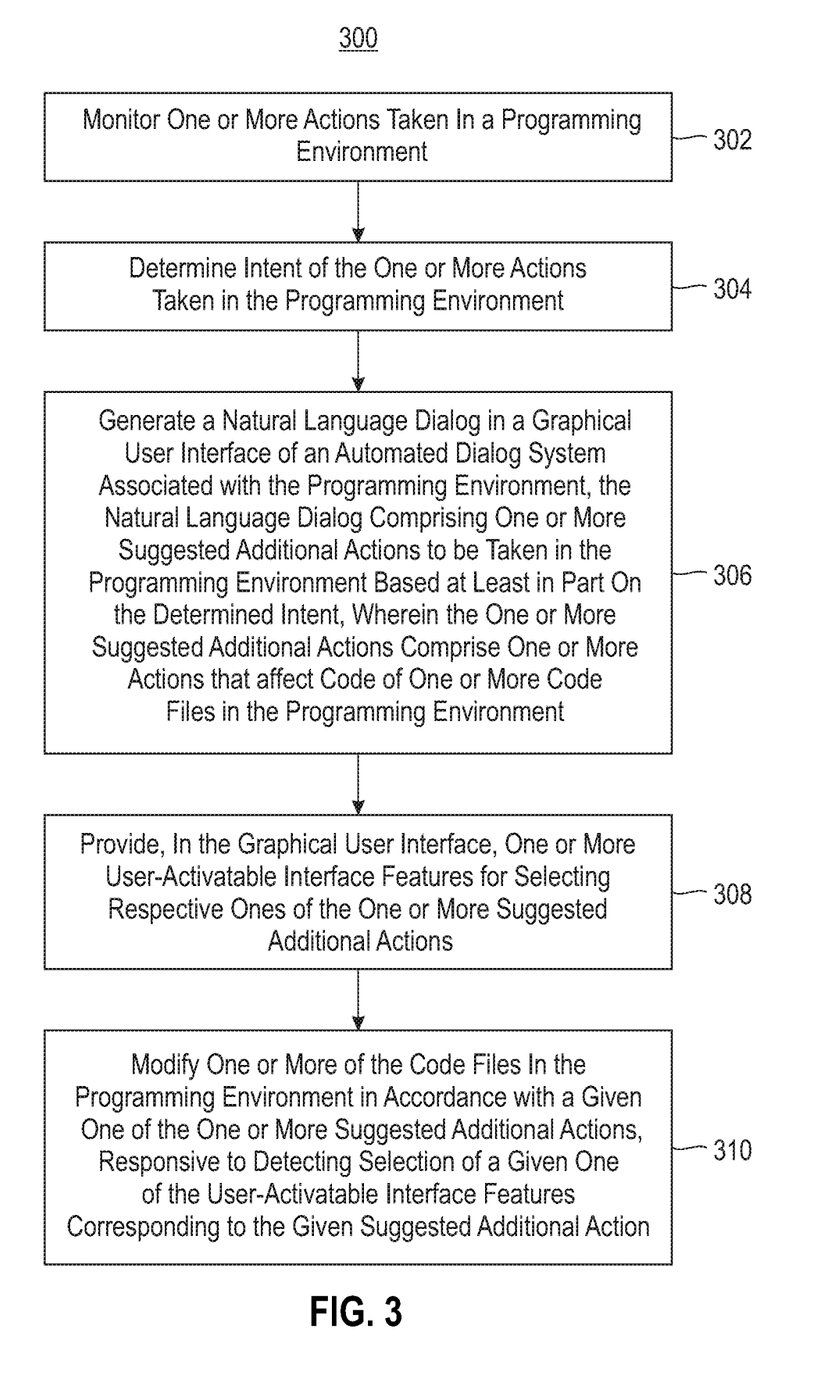
FIG. 3 depicts a process for augmenting a programming environment using an automated dialog system, according to an exemplary embodiment of the present invention.

FIG. 3 depicts a process flow 300 for augmenting a programming environment using an automated dialog system. The process flow 300 begins with step 302, monitoring one or more actions taken in a programming environment. Such actions may include, by way of example, opening one or more projects or workspaces, opening one or more code files of one or more projects or workspaces, viewing help documentation or other external documents related to the programming environment, generating code in one or more code files, editing or selecting a portion of code in one or more code files, etc. In step 304, the intent of the one or more actions taken in the programming environment is determined. Step 304 may include determining multiple intents, such as an intent associated with each of two or more of the actions monitored in step 302. Alternately, step 304 may include determining one intent based on multiple actions monitored in step 302.

In some embodiments, step 304 includes analyzing a plurality of elements in the programming environment to determine the intent. Such elements may include various program constructs, including but not limited to comments in the code, code inputs, code outputs, code objectives, file names, project or workspace names, function names, function parameter names, variable names, etc. Analyzing such elements may include, for a given one of the program constructs, determining word boundaries in the given program construct using at least one of changes in case and special characters (e.g., underscores), dividing the given program construct into one or more words based at least in part on the determined word boundaries, obtaining a set of dictionary terms for the one or more words, performing alignment with one or more external documents for each of the obtained set of dictionary terms, and utilizing the aligned external documents to determine the intent. Obtaining the set of dictionary terms for the one or more words comprises, for a given word not having an associated term in the dictionary, selecting a set of surrounding dictionary terms for the given word and, for each of the set of surrounding dictionary terms, checking for sequential alphabet containment match to derive a corresponding dictionary term for the given word.

Performing the alignment may comprise keyword matching respective ones of the obtained set of dictionary terms with words in the external documents. The external documents comprise at least one of code snippets from a code snippet repository, alternative libraries from an alternative library repository, code from a trusted code repository, and web sources from a trusted web sources repository.

In step 306, a natural language dialog is generated in a GUI of an automated dialog system that is associated with the programming environment. The natural language dialog comprises one or more suggested additional actions to be taken in the programming environment based at least in part on the determined intent. The one or more suggested additional actions comprise one or more actions that affect code of one or more code files in the programming environment. Step 306 may utilize a natural language model adapted to a domain of the programming environment to wrap natural language phrases around a core response. The core response may include a snippet extracted from an external document, the snippet comprising at least one of a web quote, a library documentation snippet, a code snippet, a programming practice manual snippet, and an integrated development environment documentation snippet.

In step 308, one or more user-activatable interface features are provided in the GUI of the automated dialog system. The one or more user-activatable interface features enable selection of respective ones of the one or more suggested additional actions in the natural language dialog generated in step 306. In step 310, one or more of the code files in the programming environment are modified in accordance with a given one of the one or more suggested additional actions, responsive to detecting selection of a given one of the user-activatable interface features corresponding to the given suggested additional action. Step 310 may include insertion of code into a given one of the code files in the programming environment, upgrading one or more libraries utilized in the given code file, tracing a code anomaly in a given one of the code files in the programming environment, or combinations of these and other actions described herein.

Figure 4:
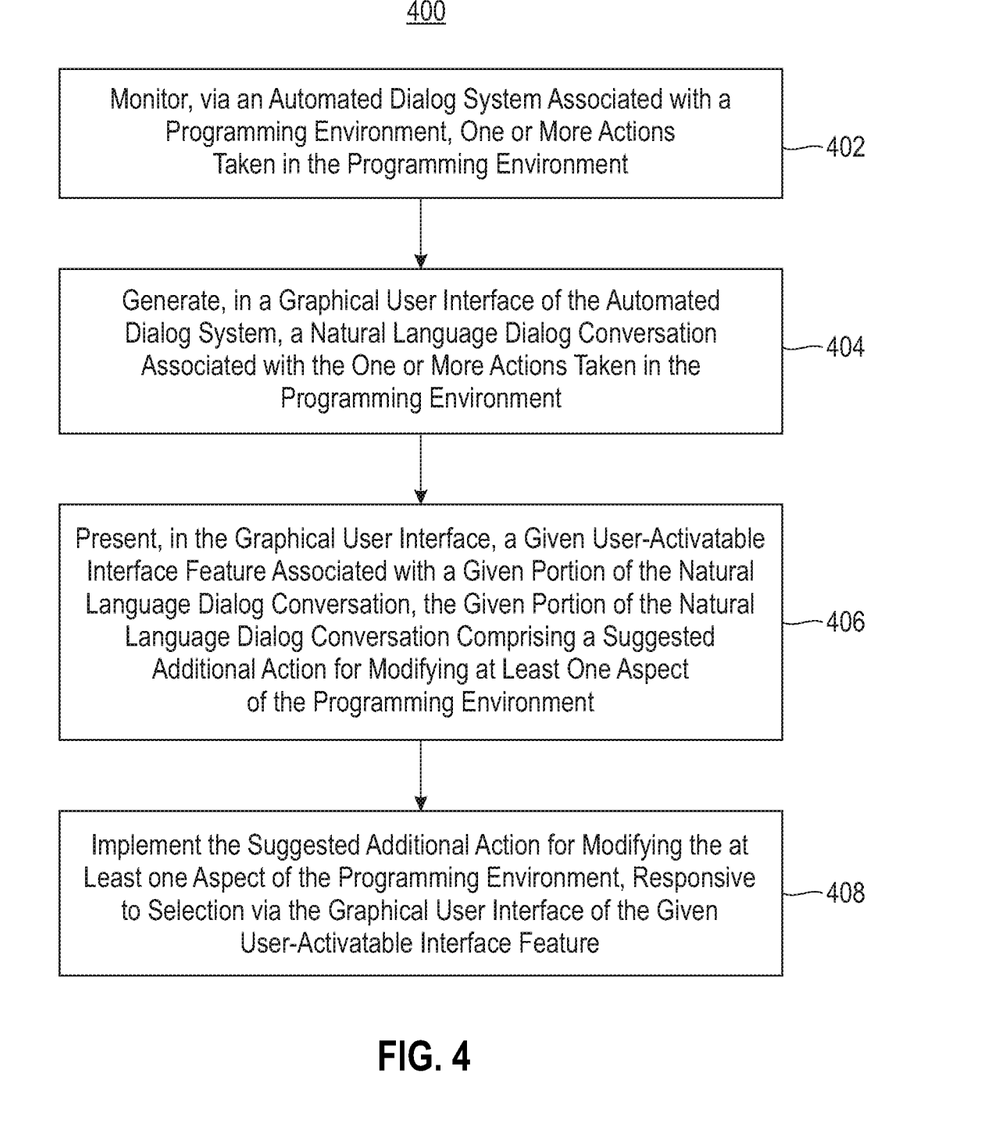
FIG. 4 depicts another process for augmenting a programming environment using an automated dialog system, according to an exemplary embodiment of the present invention.

FIG. 4 depicts a process flow 400 for augmenting a programming environment using an automated dialog system. The process flow 400 begins with step 402, monitoring, via an automated dialog system associated with a programming environment, one or more actions taken in the programming environment. In step 404, a natural language dialog conversation associated with the one or more actions taken in the programming environment is generated in a GUI of the automated dialog system.

In some embodiments, step 404 includes reactively generating the natural language dialog conversation in response to one or more user queries submitted to the automated dialog system via the graphical user interface. In other embodiments, step 404 includes proactively generating the natural language dialog conversation based on determining an intent of the one or more actions taken in the programming environment.

In step 406, a given user-activatable interface feature associated with a given portion of the natural language dialog conversation is presented in the GUI. The given portion of the natural language dialog conversation comprises a suggested additional action for modifying at least one aspect of the programming environment. In step 408, the suggested additional action for modifying the at least one aspect of the programming environment is implemented, responsive to selection via the graphical user interface of the given user-activatable interface feature. Implementing the suggested additional action may comprise at least one of: inserting code into a given code file in the programming environment, upgrading one or more libraries utilized in the given code file, or tracing a code anomaly in the given code file.

The automated dialog system or chatbots described herein may be augmented into various programming platforms, including but not limited to IBM Web Sphere®, client-site programming services, etc. The automated dialog systems augmenting such programming platforms advantageously may be used to reduce the coding cycle allowing programmers to churn out effective code efficiently in shorter time at high speeds.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
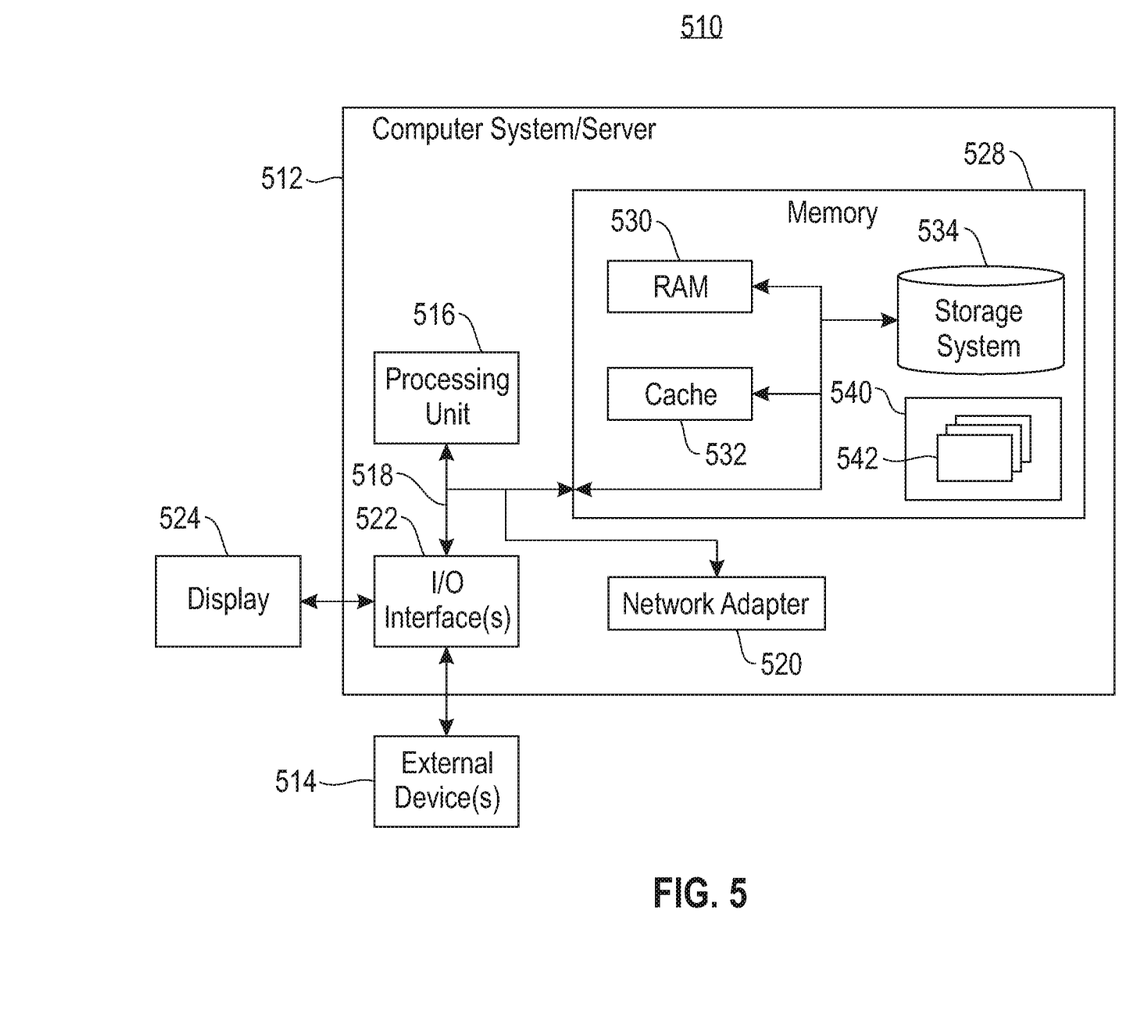
FIG. 5 depicts a computer system in accordance with which one or more components/steps of techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
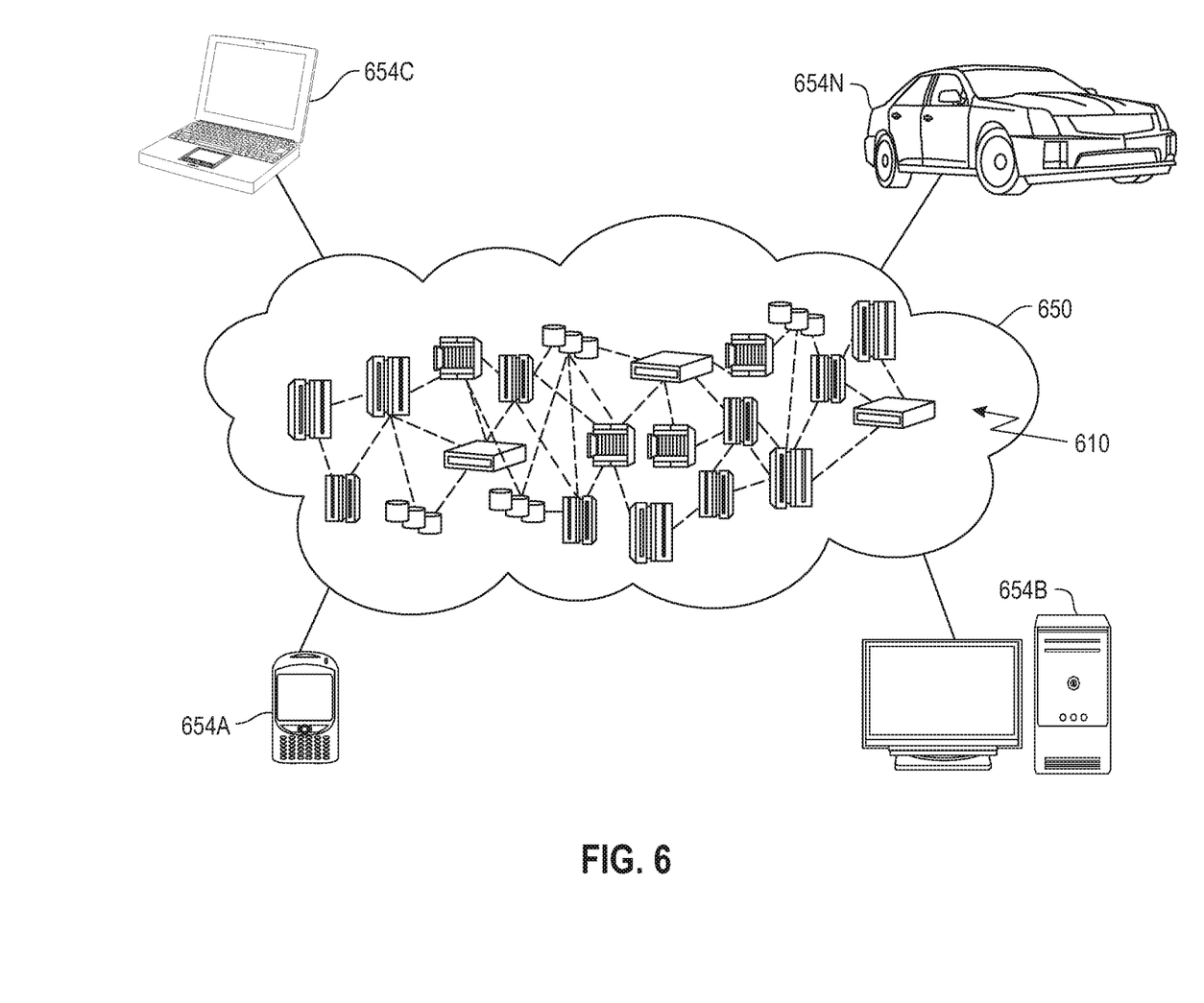
FIG. 6 depicts a cloud computing environment, according to an exemplary embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
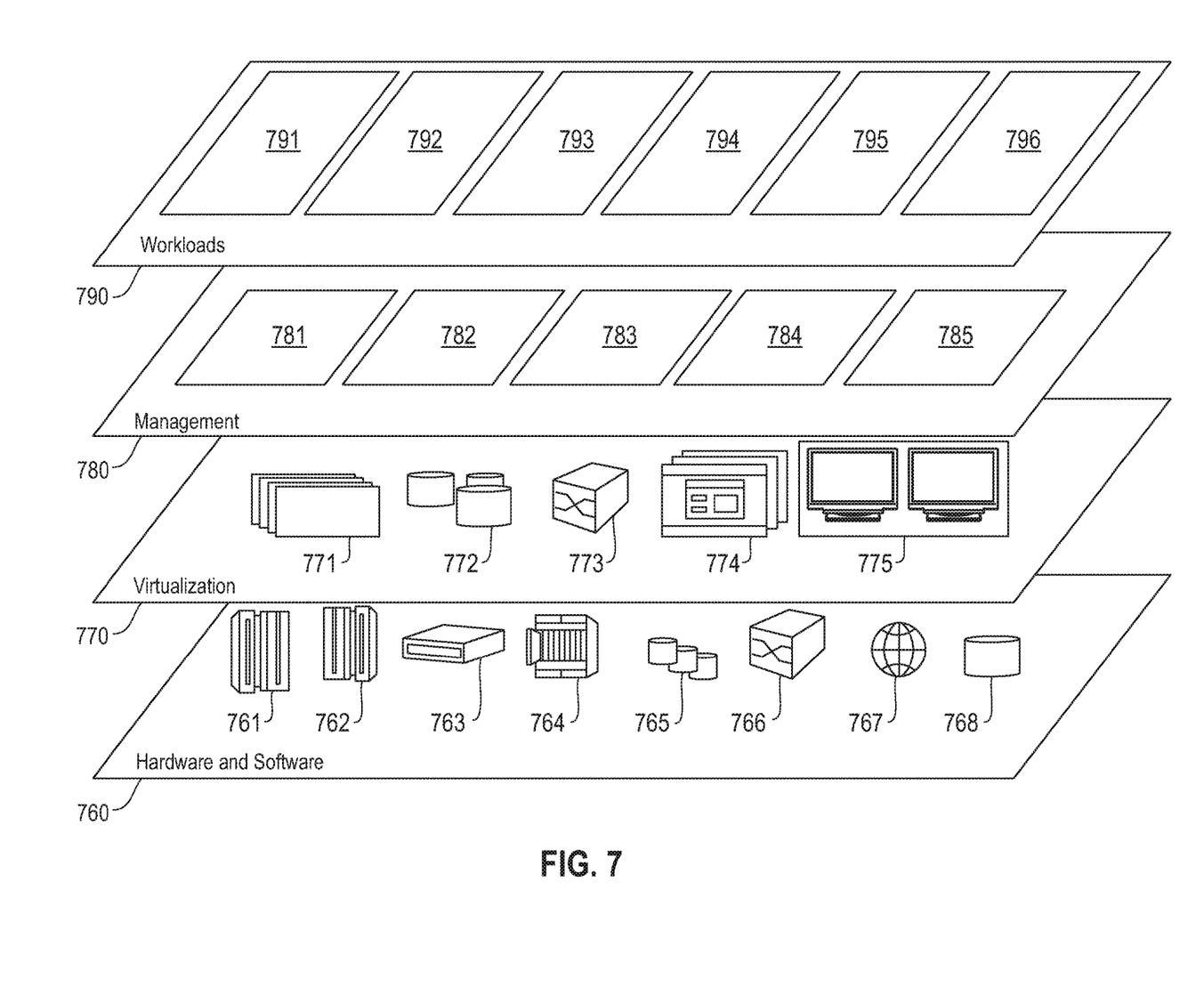
FIG. 7 depicts abstraction model layers, according to an exemplary embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and chatbot assistance processing 796, which may perform various functions described above with respect to the programming system with chatbot assistance techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
   monitoring one or more actions taken in a programming environment for developing software code;
   determining intent of the one or more actions taken in the programming environment, wherein said determining comprises analyzing a plurality of elements in the programming environment to determine the intent, wherein the plurality of elements comprise one or more program constructs, wherein the one or more program constructs comprise at least one of (i) file names, (ii) project names, (iii) function names, (iv) function parameter names, and (v) variable names, and wherein said analyzing the plurality of elements comprises, for a given one of the program constructs:
   determining word boundaries in the given program construct using at least one of: changes in case and special characters;
   dividing the given program construct into one or more words based at least in part on the determined word boundaries;
   obtaining a set of dictionary terms for the one or more words;
   performing alignment with one or more external documents for each of the obtained set of dictionary terms; and utilizing the aligned external documents to determine the intent;

generating a natural language dialog in a graphical user interface of an automated dialog system associated with the programming environment, the natural language dialog comprising one or more suggested additional actions to be taken in the programming environment based at least in part on the determined intent, wherein the one or more suggested additional actions comprise one or more actions that affect code of one or more code files in the programming environment;

providing, in the graphical user interface, one or more user-activatable interface features for selecting respective ones of the one or more suggested additional actions; and modifying one or more of the code files in the programming environment in accordance with a given one of the one or more suggested additional actions, responsive to detecting selection of a given one of the user-activatable interface features corresponding to the given suggested additional action;

wherein the steps are carried out by at least one processing device.

2. The computer-implemented method of claim 1, wherein the one or more program constructs comprise at least one of: comments in the code; code inputs; code outputs; and code objectives.

3. The computer-implemented method of claim 1, wherein said obtaining the set of dictionary terms for the one or more words comprises, for a given word not having an associated term in the dictionary:

selecting a set of surrounding dictionary terms for the given word; and for each term in the set of surrounding dictionary terms, checking for sequential alphabet containment match to derive a corresponding dictionary term for the given word.

4. The computer-implemented method of claim 1, wherein said performing the alignment comprises keyword matching respective ones of the obtained set of dictionary terms with words in the external documents.

5. The computer-implemented method of claim 1, wherein the external documents comprise at least one of: code snippets from a code snippet repository; alternative libraries from an alternative library repository; code from a trusted code repository; and web sources from a trusted web sources repository.

6. The computer-implemented method of claim 1, wherein said generating the natural language dialog comprises utilizing a natural language model adapted to a domain of the programming environment to wrap natural language phrases around a core response.

7. The computer-implemented method of claim 6, wherein the core response comprises a snippet extracted from an external document, the snippet comprising at least one of a web quote, a library documentation snippet, a code snippet, a programming practice manual snippet, and an integrated development environment documentation snippet.

8. The computer-implemented method of claim 1, wherein the given suggested additional action comprises insertion of code into a given one of the code files in the programming environment.

9. The computer-implemented method of claim 1, wherein the given suggested additional action comprises upgrading one or more libraries utilized in a given one of the code files in the programming environment.

10. The computer-implemented method of claim 1, wherein the given suggested additional action comprises tracing a code anomaly in a given one of the code files in the programming environment.

11. A computer program product, the computer program product comprising a computer readable storage medium having program instructions embodied therewith, the program instructions executable by at least one computing device to cause the at least one computing device to perform steps of:

monitoring one or more actions taken in a programming environment for developing software code;

determining intent of the one or more actions taken in the programming environment wherein said determining comprises analyzing a plurality of elements in the programming environment to determine the intent, wherein the plurality of elements comprise one or more program constructs, wherein the one or more program constructs comprise at least one of (i) file names, (ii) project names, (iii) function names, (iv) function parameter names, and (v) variable names, and wherein said analyzing the plurality of elements comprises, for a given one of the program constructs:

determining word boundaries in the given program construct using at least one of: changes in case and special characters;

dividing the given program construct into one or more words based at least in part on the determined word boundaries;

obtaining a set of dictionary terms for the one or more words;

performing alignment with one or more external documents for each of the obtained set of dictionary terms; and utilizing the aligned external documents to determine the intent;

generating a natural language dialog in a graphical user interface of an automated dialog system associated with the programming environment, the natural language dialog comprising one or more suggested additional actions to be taken in the programming environment based at least in part on the determined intent, wherein the one or more suggested additional actions comprise one or more actions that affect code of one or more code files in the programming environment;

providing, in the graphical user interface, one or more user-activatable interface features for selecting respective ones of the one or more suggested additional actions; and modifying one or more of the code files in the programming environment in accordance with a given one of the one or more suggested additional actions, responsive to detecting selection of a given one of the user-activatable interface features corresponding to the given suggested additional action.

12. A system comprising:

a memory; and at least one processor coupled to the memory and configured for:

monitoring one or more actions taken in a programming environment for developing software code;

determining intent of the one or more actions taken in the programming environment, wherein said determining comprises analyzing a plurality of elements in the programming environment to determine the intent, wherein the plurality of elements comprise one or more program constructs, wherein the one or more program constructs comprise at least one of (i) file names, (ii) project names, (iii) function names, (iv) function parameter names, and (v) variable names, and wherein said analyzing the plurality of elements comprises, for a given one of the program constructs:
  determining word boundaries in the given program construct using at least one of: changes in case and special characters;
  dividing the given program construct into one or more words based at least in part on the determined word boundaries;
  obtaining a set of dictionary terms for the one or more words;
  performing alignment with one or more external documents for each of the obtained set of dictionary terms; and
  utilizing the aligned external documents to determine the intent;
generating a natural language dialog in a graphical user interface of an automated dialog system associated with the programming environment, the natural language dialog comprising one or more suggested additional actions to be taken in the programming environment based at least in part on the determined intent, wherein the one or more suggested additional actions comprise one or more actions that affect code of one or more code files in the programming environment;
providing, in the graphical user interface, one or more user-activatable interface features for selecting respective ones of the one or more suggested additional actions; and
modifying one or more of the code files in the programming environment in accordance with a given one of the one or more suggested additional actions, responsive to detecting selection of a given one of the user-activatable interface features corresponding to the given suggested additional action.

13. A computer-implemented method, comprising steps of:
  monitoring, via an automated dialog system associated with a programming environment for developing software code, one or more actions taken in the programming environment;
  generating, in a graphical user interface of the automated dialog system, a natural language dialog conversation associated with the one or more actions taken in the programming environment, wherein said generating the natural language dialog conversation comprises proactively generating the natural language dialog conversation based on determining an intent of the one or more actions taken in the programming environment, wherein said determining an intent comprises analyzing a plurality of elements in the programming environment to determine the intent, wherein the plurality of elements comprise one or more program constructs, wherein the one or more program constructs comprise at least one of (i) file names, (ii) project names, (iii) function names, (iv) function parameter names, and (v) variable names, and wherein said analyzing the plurality of elements comprises, for a given one of the program constructs:
    determining word boundaries in the given program construct using at least one of: changes in case and special characters;
    dividing the given program construct into one or more words based at least in part on the determined word boundaries;
    obtaining a set of dictionary terms for the one or more words;
    performing alignment with one or more external documents for each of the obtained set of dictionary terms; and
    utilizing the aligned external documents to determine the intent;
  presenting, in the graphical user interface, a given user-activatable interface feature associated with a given portion of the natural language dialog conversation, the given portion of the natural language dialog conversation comprising a suggested additional action for modifying at least one aspect of the programming environment; and
  implementing the suggested additional action for modifying the at least one aspect of the programming environment, responsive to selection via the graphical user interface of the given user-activatable interface feature;
  wherein the steps are carried out by at least one processing device.

14. The computer-implemented method of claim 13, wherein said generating the natural language dialog conversation comprises reactively generating the natural language dialog conversation in response to one or more user queries submitted to the automated dialog system via the graphical user interface.

15. The computer-implemented method of claim 13, wherein said implementing the suggested additional action comprises at least one of:
  inserting code into a given code file in the programming environment;
  upgrading one or more libraries utilized in the given code file; and
  tracing a code anomaly in the given code file.

* * * * *